United States Patent
Rivers (10) Patent No.: US 7,552,277 B2
(45) Date of Patent: Jun. 23, 2009

(54) DISTRIBUTED BUFFER INTEGRATED CACHE MEMORY ORGANIZATION AND METHOD FOR REDUCING ENERGY CONSUMPTION THEREOF

(75) Inventor: Jude A. Rivers, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 10/644,210

(22) Filed: Aug. 20, 2003

(65) Prior Publication Data

US 2005/0044317 A1 Feb. 24, 2005

(51) Int. Cl.
*G06F 13/00* (2006.01)

(52) U.S. Cl. .................. 711/114; 711/170; 711/230; 711/206

(58) Field of Classification Search ............... 711/108, 711/154, 156, 159, 114, 170, 203, 206
See application file for complete search history.

(56) References Cited

U.S. PATENT DOCUMENTS

| | | | | | |
|---|---|---|---|---|---|
| 4,442,487 | A | * | 4/1984 | Fletcher et al. | 711/122 |
| 5,802,568 | A | * | 9/1998 | Csoppenszky | 711/136 |
| 6,625,715 | B1 | * | 9/2003 | Mathews | 711/207 |
| 2002/0159283 | A1 | * | 10/2002 | Chai et al. | 365/49 |
| 2004/0010675 | A1 | * | 1/2004 | Moritz | 711/202 |

OTHER PUBLICATIONS

M Zhang and K. Asanovich, Highly Associative Caches for Low-Power Processors, Kool Chips Workshop, 33rd Int'l Symposium on Microarchitecture, , Published in: US.

Juce A. Rivers, Performance of High-Bandwidth Multi-Lateral Cache Organizations, Apr. 1, 1998, pp. 143-147.

J. A. Rivers et al. "Reducing conflicts in direct-mapped caches with a temporality-based design." In Proceedings of the 1996 ICPP, pp. 154-163, Aug. 1996.

J. A. Rivers et al. "On effective data supply for multi-issue processors." In Proceedings of ICCD'97, pp. 519-528, Oct. 1997.

J. A. Rivers et al. "Utilizing reuse information in data cache management." In Proceedings of ICIS'98, pp. 449-456, 1998.

Edward S. Tam et al. "Evaluating the Performance of Active Cache Management Schemes" Proceedings of the 1998 International Conference on Computer Design, Oct. 1998.

(Continued)

*Primary Examiner*—Reba I Elmore
(74) *Attorney, Agent, or Firm*—Law Office of Charles W. Peterson, Jr.; Louis J. Percello, Esq.; Brian P. Verminski, Esq.

(57) ABSTRACT

A cache memory that may include a content addressable memory, random access memory (CAMRAM) cache and method for managing a cache to reduce cache energy consumption. A cache buffer receives incoming data and buffers a storage array. The cache buffer holds a number of most recently accessed data blocks. In any access, cache buffer locations are checked before checking the storage array.

23 Claims, 6 Drawing Sheets

OTHER PUBLICATIONS

J.A. Rivers et al., "On High-Bandwidth Data Cache Design for Multi-Issue Processors," Proc. 30th Int'l Symp. Microarchitecture, pp. 46-56, Dec. 1997.

Edward S. Tam et al. "Active Management of Data Caches by Exploiting Reuse Information" IEEE Transactions on Computers, vol. 48, No. 11, pp. 1244-1259, Nov. 1999.

J. A. Rivers, Performance Aspects of High-Bandwidth Multi-Lateral Cache Organizations, Apr. 1, 1998.

J.A. Rivers et al., "Performance Issues in Integrating Temporality-Based Caching" Elsevier, Aug. 26, 1996.

* cited by examiner

DISTRIBUTED BUFFER INTEGRATED CACHE MEMORY ORGANIZATION AND METHOD FOR REDUCING ENERGY CONSUMPTION THEREOF

BACKGROUND OF THE INVENTION

1. Field of the Invention

The present invention is related to cache memories and more particularly to storing and accessing data in a cache memory for reduced energy consumption.

2. Background Description

Random access memories (RAMs) are well known in the art. A typical RAM has a memory array wherein every location is addressable and freely accessible by providing the correct corresponding address. Dynamic RAMs (DRAMs) are dense RAMs with a very small memory cell. High performance Static RAMs (SRAMs) are somewhat less dense (and generally more expensive per bit) than DRAMs, but expend more power in each access to achieve speed, i.e., provide better access times than DRAMs at the cost of higher power. Content addressable memories (CAMs), which also are well known in the art, relate memory locations to detectable values (i.e., location content) and have two modes of operation. In a storage mode of operation the CAM accepts data for particular locations (e.g., reading/writing to CAM locations), similar to loading a RAM or loading data in a register file. In a second content addressable or search mode, CAM storage locations are identified by and selected by what the locations contain. A particular identifying value, typically called a Comparand is provided, and the array is searched for a match by comparing array contents to the Comparand.

In a typical data processing system, the bulk of the memory is DRAM in main memory with faster SRAM in cache memory, closer to the processor or microprocessor. Caching is known as an effective technique for increasing microprocessor performance. Typical cache memories are organized with data stored in blocks and, data and tag information in a cache line for each cached data block. Each data block is identified by one of n tags, where each tag may be a virtual index into the cache. The tag, normally, includes the upper bits of a virtual address in combination with an address space identifier that is unique to a particular process. Locating a block in cache requires searching cache line data for the virtual address, i.e., the tag, which may be located in one and only one cache location. So, unfortunately, caching is also a major contributor to microprocessor system energy consumption.

Consequently, because finding a virtual address in RAM requires checking cache lines sequentially, until the virtual address is located; CAMs work well for cache memory applications, especially for finding a particular tag associated with a selected virtual memory address. In particular, an n-way associative cache memory does n tag and data checks in CAM in parallel and, provided the selected block is in cache, quickly locates the tag for the selected block and ignores the rest.

Figure 1:
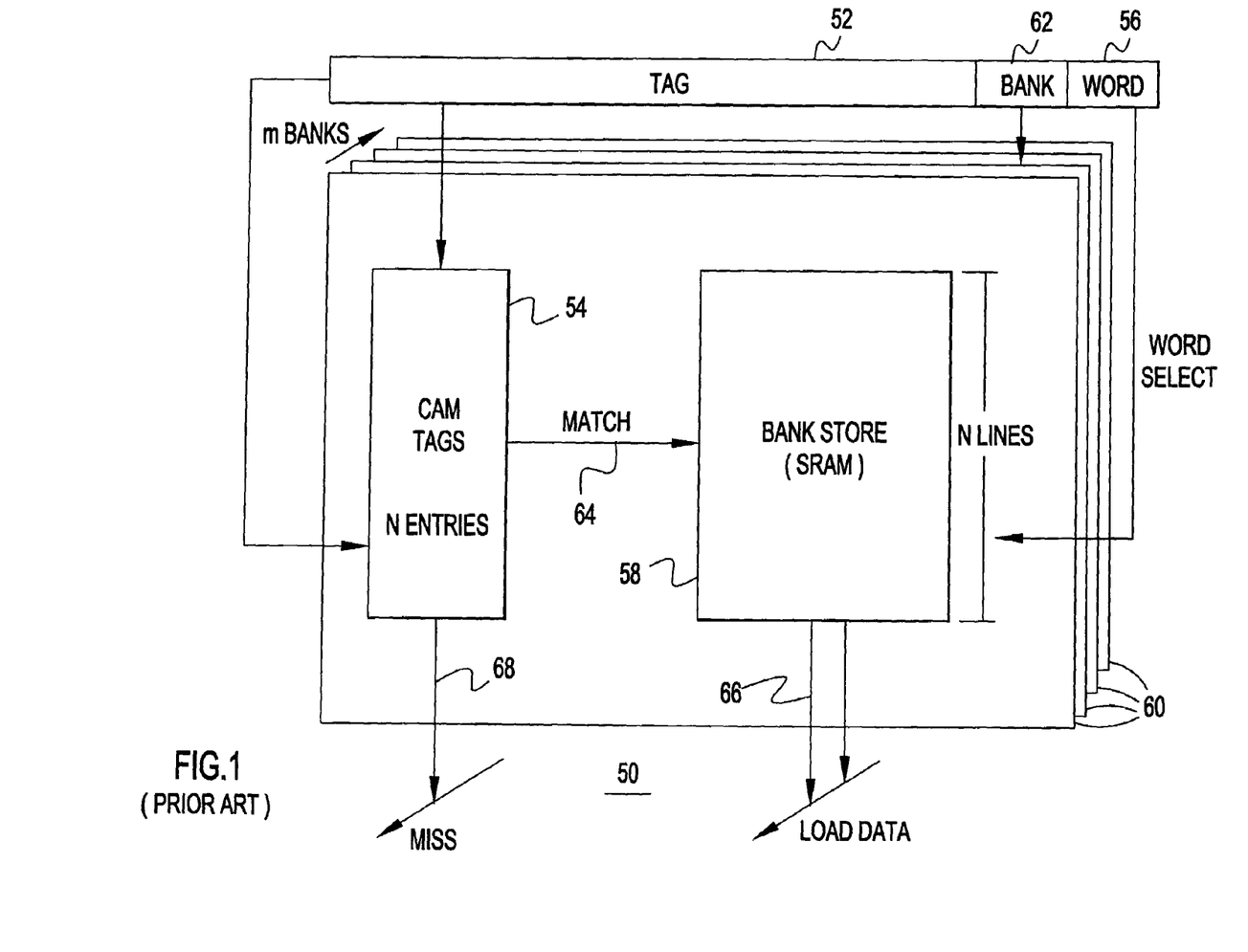
FIG. 1 shows an example of a state of the art CAMRAM.

Accordingly as illustrated in FIG. 1, in what is known as a CAMRAM cache 50, tags 52 are stored in CAM 54 and associated data 56 is stored in a bank store (BS) 58, typically SRAM. In this example the CAMRAM 50 is an m (4 in this example) bank 60 cache. Each bank 60 is identified by a bank tag 62. If the incoming tag 52 matches one of the n entries in the CAM 54, that match 64 selects a corresponding data block in BS 58, which is made available for access 66, e.g., as output or for a cached store. Otherwise, a miss 68 is returned and the incoming request is directed to data located elsewhere, e.g., in main memory.

Standard cache memories store data and tag information in the RAM of a cache line. The hardware finds the data based on the virtual address, reads the data and checks the tag against the value stored in the line. The tag for a virtually indexed cache includes the upper bits of the virtual address and an address space identifier, which is unique to a process. An n-way associative cache memory does n tag and data checks in parallel, throwing out the value of all but one of them. While associativity is good and lowers cache miss rates while improving microprocessor performance, the redundant work it requires has a high energy cost. Direct-mapped caches, with associativity of 1, only read one tag and one data word/block and have lower hit energy. However, they have much larger miss rates due to conflicts and since the energy cost per miss is higher, they tend to have larger total memory access energy. Techniques like way-predicting caches can provide associativity at lower hit energy by only checking one way in an n-way set associative cache, but tend to incur energy and delay penalties to access the way-prediction table on way hits and additional energy and performance penalties if predictions are incorrect. Caches are also often split into subbanks, which handle certain address ranges. Bank addresses are direct mapped using the appropriate virtual address bits.

CAMRAM caching facilitates higher associativity and can reduce power consumption because of its sequential tag and data access. During a CAMRAM access, the search tag of the incoming address is broadcast to the tags depository i.e., the CAM. A matching tag (if any) locates the blocks in cache RAM that is requested for access, i.e., requested for a read operation or cached for storage in a store operation. M. Zhang and K Asanovich, "Highly-Associative Caches for Low-Power Processors," *Kool Chips Workshop*, 33rd Int'l Symposium on Microarchitecture, (2000) describes how a 32-way CAM-tag search uses abut the same power as a 2-way set associative RAM-tag search. For additional power reduction, CAM-tag caches are often subbanked with a multi phased access. Typically, the CAM-tag compare is the first access phase, where each CAM cell compares its stored value in place with an arriving address. If there is a match in the first phase, the actual data read or write to cache occurs in the next phase.

Unfortunately, CAM-tag caches still use a significant amount of power finding the associated data in the first phase because the arriving address is broadcast to all of the CAM bank locations. Typically, more than half of CAMRAM cache power is consumed in the CAM-tag checking phase. Consequently, CAMRAM power is directly related to the number of bank entries, i.e., the larger the bank, the more power required. For an energy-efficient cache design, therefore, the designer must find the proper mix of associativity, size, structure configuration, and partitioning to achieve an acceptable energy consumption level. Achieving such a mix without proper regards to the inherent code and data behavior of targeted workloads has been difficult.

Thus, there is a need to reduce the number of tag checks per access and further, to reduce cache memory power consumption.

SUMMARY OF THE INVENTION

It is a purpose of the invention to reduce cache power consumption;

It is another purpose of the invention to reduce cache power consumption while maintaining cache performance;

It is yet another purpose of the invention to quickly determine whether memory being accessed is in cache while reducing cache power consumption.

The present invention relates to a cache memory, content addressable memory, random access memory (CAMRAM) cache and method of managing a cache. A cache buffer receives incoming data and buffers a storage array. The cache buffer holds a number of most recently accessed data blocks. In any access, cache buffer locations are checked before checking the storage array.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 2A:
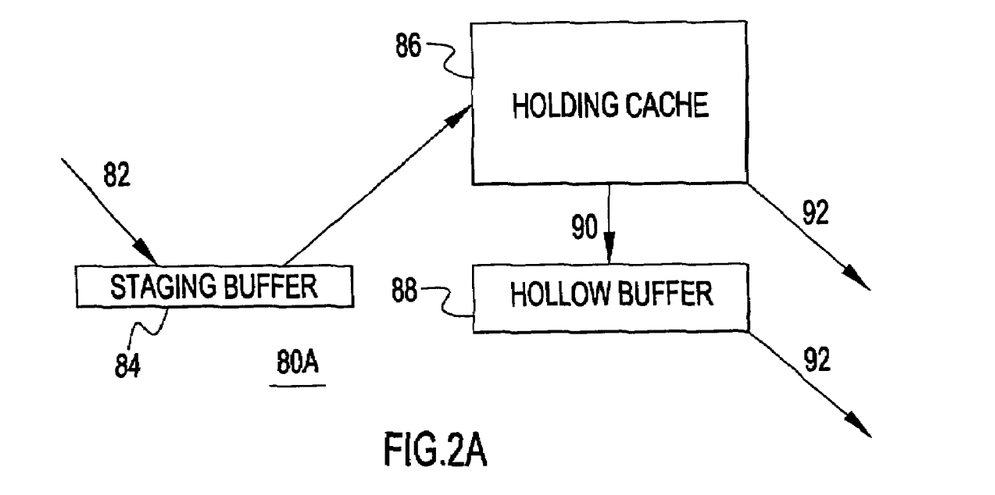
FIGS. 2A-B show data flow examples of cache accesses according to a preferred embodiment of the present invention.
Figure 2B:
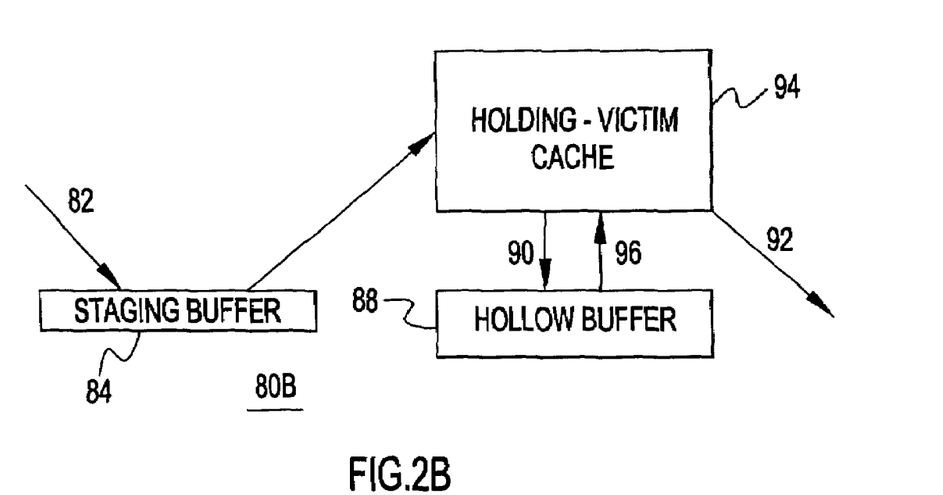

Turning now to the drawings and, more particularly, FIGS. 2A-B show data flow examples 80A-B of cache accesses according to a preferred embodiment of the present invention with like numbered elements labeled identically. In FIG. 2A, a line in 82, e.g., from main memory or level 2(L2) cache (not shown), is first brought into a staging buffer 84. A CPU data request is first presented in parallel to the staging buffer 84 and the hollow buffer 88 (which holds a number (i) of the most recently accessed lines from the holding cache); and, when the item is not found the request is then presented to the holding cache 86. When a data request is to data not found in either of the buffers 84, 88, but is in the holding cache 86, that data 90 is brought into the hollow buffer 88. A cache miss occurs when the requested data is not found in cache buffers 84, 88 or the holding cache 86. Upon a cache miss, the data from the staging buffer 84 is promoted into the holding cache 86 and the incoming missed data block 82 is brought into the staging buffer 84. A cache line is replaced 92 from the cache system from either the holding cache 86 or the hollow buffer 88. The example of FIG. 2B is substantially similar to that of FIG. 2A, except that data that must be replaced 92 from the hollow buffer is instead placed back 96 into the holding cache 86 making it the holding-victim cache 94. In example 2B, therefore, a cache line is replaced 92 from the cache system only from the holding-victim cache 94.

Thus, the buffers 84, 88 hold the most active cache lines and buffer the holding cache 86, which is dormant unless a data request is directed to data that is not found in the buffers 84, 88. So, for any cache access, first the cache buffers, staging buffer 84 and hollow buffer 88, are checked. Only if the target data are not found in this first check, are the remaining holding cache 86 locations checked. Accordingly, since analysis has shown that more than 85% of all data accesses are found in this initial search, limiting the initial search to the cache buffer 84, 88 substantially reduces cache power consumption. It should be noted that although described herein below with reference to content addressable memory (CAM) random access memory (RAM) or CAMRAM cache, this is for example only and not intended as a limitation. The present invention has application to any suitable memory architecture wherein at any one time, a few locations may be accessed more frequently than the remaining locations.

Figure 3:
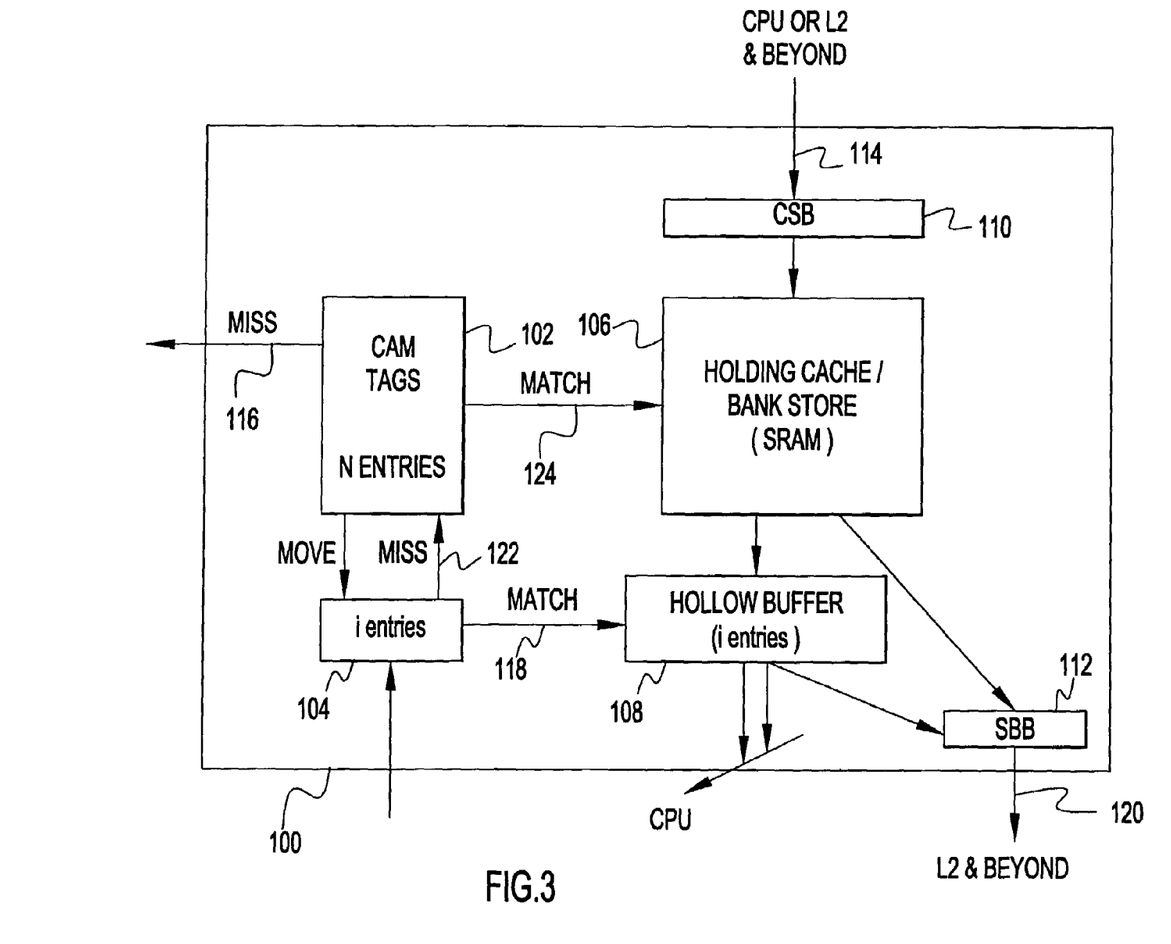
FIG. 3 shows an example of a preferred embodiment single bank cache memory according to the present invention.

FIG. 3 shows a CAMRAM example of a preferred embodiment cache memory 100 according to the present invention, a single bank cache memory in this example. In this example, the cache memory is a CAMRAM cache with a two phase access for improved (lower) power consumption. Tags are stored in an n-location CAM or n-CAM 102 and an i-location CAM or i-CAM 104, where n>i and although, i may have any value, preferably, i=8. Similarly, data storage includes an n block deep holding cache (HC) 106 or bank store and a shallow or hollow output buffer, i.e., an i block deep hollow buffer (HB) 108. It should be noted that a block may be a single word or multiple words and, further, includes any portion of a block or subblock. The n tags in the n-CAM 102 are each associated with corresponding blocks in HC 106 and i-CAM tags being associated with corresponding blocks in HB 108. Preferably, the HB 108 is a fast and low power memory array, e.g., an i-stage register file, that is accessible externally, i.e., both readable and writeable. Incoming cache lines are stored as lines in a cache staging buffer (CSB) 110 which serves as an input staging buffer for external data being passed, e.g., to/from a second level (L2) cache and data from a cache hit is passed to/from a stored bank buffer (SBB) 112. Only the CSB 110 can write to the HC 106. However, the CSB 110 can be both read from and written into by the microprocessor, and written into by a higher level memory.

Power is reduced in CAMRAM cache 100 over prior art CAMRAM caches without significant performance degradation because the buffers contain the most likely target locations and the initial search is directed to those location. In particular, the i most recently accessed cache data blocks, which have the highest likelihood of being requested in immediately subsequent accesses, are held in the HB 108. So, in any immediately subsequent access, the incoming tag is compared against i-CAM entries, which are most likely to match. Thus, finding a match in the i-CAM 104 saves power, CAM power that is otherwise expended searching n-CAM 102.

Preferably, the n-CAM 102 is a circular first in first out (FIFO), such that as a new tag is loaded, the most stale tag (i.e., with the longest time since last use) is shifted out or unloaded and a corresponding block is released in HC 106. The i-CAM 104 is organized by Least Recently Used (LRU) and, preferably, is also a circular FIFO with entries mapping one-to-one with HB 108 entries. Preferably, the HB 108 is a fully associative structure, associating HB 108 entries with blocks in HC 106. The CSB 110 is a staging storage buffer for one or more cache lines from a higher level in the memory hierarchy (not shown), e.g., from a level 2 cache or main memory. Each incoming cache line 114 is loaded into the CSB 110 and is only promoted into the HC 106 following a cache miss 116 in the level one structure that necessitates uploading the new block into the CSB 110. Once a cache line is promoted from the CSB 110 to the HC 106, any subsequent access to that cache line, a copy of that cache line is promoted from the HC 106 to the HB 108 and, coincidentally, a copy of the corresponding tag is passed from the n-CAM 102 to the i-CAM 104. A copy of a cache line being moved into the HB 108 from the HC 106 may also remain in the HC 106. However, if a copy is left in the HC 106, then, every time a cache line is written into in the HB 108, the HC 106 must be searched to find and invalidate the corresponding copy.

Accordingly, a 2 stage access of the CAMRAM cache 100 (an i-CAM 104 search followed by an n-CAM 102 search) ensures power consumed is minimized. Typically, each stage 102, 104 can be handled in a single clock cycle and accessing data in cache 100 requires no more than 2 clock cycles. In the first clock cycle or phase, both the i-CAM 104 and the CSB 110 compare a tag against their contents for match and, simultaneously, the HB 108 is prepared (pre-charged) for access. If the tag is found, i.e., a hit 118, data from the corresponding storage location, i.e., in HB 108 or CSB 110, is latched in SBB 112 and provided as CAMRAM cache output 118. Otherwise, if the tag is not found in either of the i-CAM 104 and the CSB 110, i.e., a miss 122, then, the n-CAM 102 searches for the tag and HC 106 is precharged. If the tag is found in the n-CAM 102, the match line 124 is asserted. Data from the HC 106 is latched in the HB 108, and passed through the SBB to output 120. Otherwise, a miss 116 indication is provided indicating that the data is elsewhere, e.g., in L2 cache or main memory. Thus, an access hit in the CSB 110 or HB 108 in the first cycle costs one clock cycle, while an access hit in the HC 106 occurs in a second clock cycle and costs 1 additional cycle.

Figure 4:
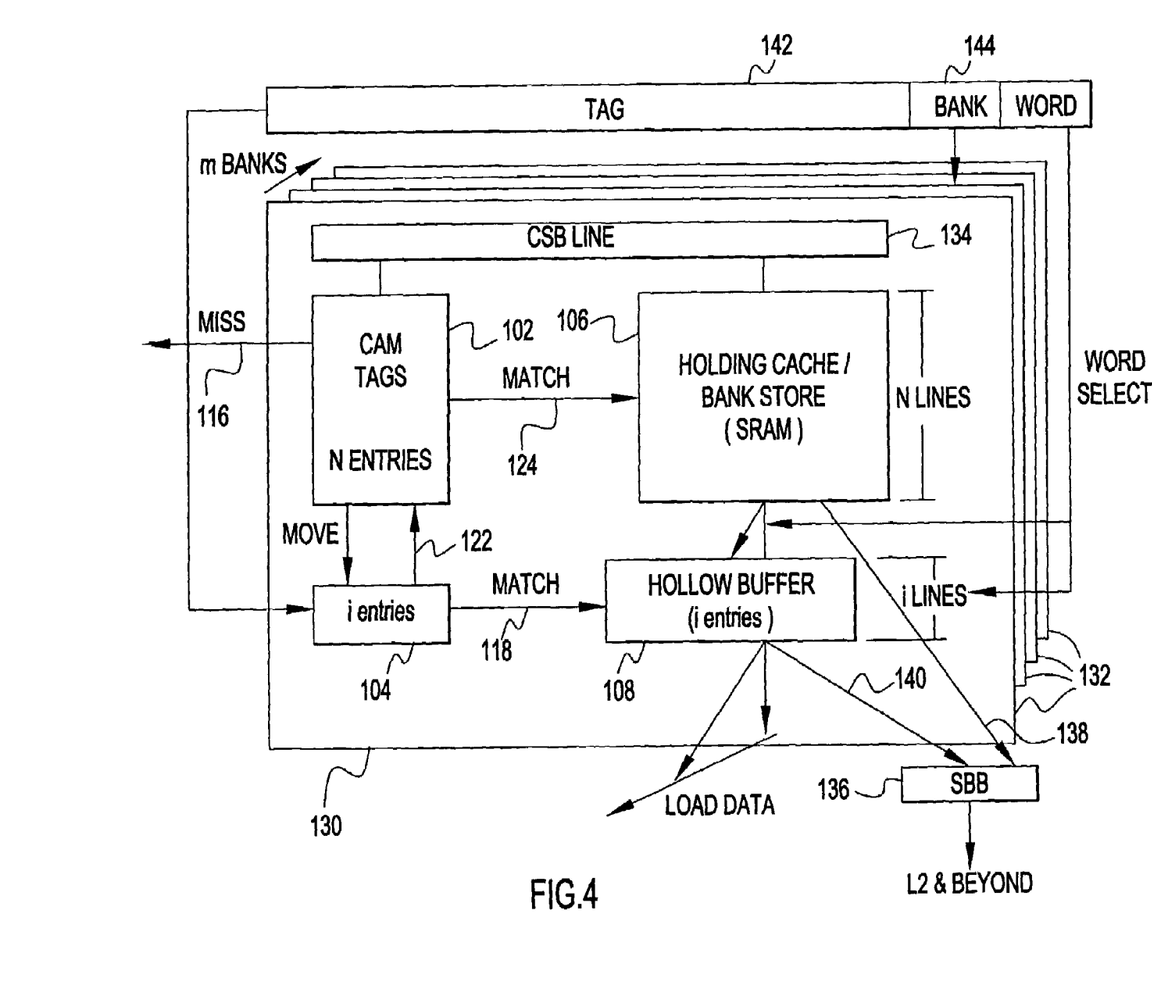
FIG. 4 shows an example of a multibank CAMRAM cache 130 embodiment.

FIG. 4 shows an example of a multibank CAMRAM cache 130 embodiment with multiple banks 132 substantially similar to the single bank embodiment 100 of FIG. 3 with like elements labeled identically. In this embodiment, the CSB includes a CSB line 134 in each bank 132. Also, a single SBB 136 serves all banks 132, receiving individual outputs 138, 140 from each bank HC 106 and HB 108. An incoming tag 142 is directed by a bank identifier 144 to a particular bank 132, with associated data at an HB 108 or provided from HC 106 to HB 108 as described above for the single bank embodiment 100. It has been shown that, frequently, consecutive cache accesses map to the same cache bank 132 and also end up in the same cache line; exhibiting an inherent spatial locality in memory access behavior that affords significant power savings in a preferred embodiment CAMRAM cache 100 or 130.

In summary, level one cache misses cause the cache line to reload into CSB line 134. Cache line data accumulates in CSB lines 134, over multiple cycles. Cache line data are passed into the HC 106 during a dead cycle in a subsequent L1 cache miss, i.e., phase 1 and phase 2. Back to back accesses to incoming cache lines are satisfied from CSB lines 132. If a cache miss is caused by a store instruction, the data is written into the CSB line 132. An n-CAM hit causes a copy of respective cache line to move from the HC 106 into the HB 108 and the corresponding HB 108 entry is invalidated. If the HB 108 is full, the HB 108 LRU entry is castout through the SBB 136.

Figure 5:
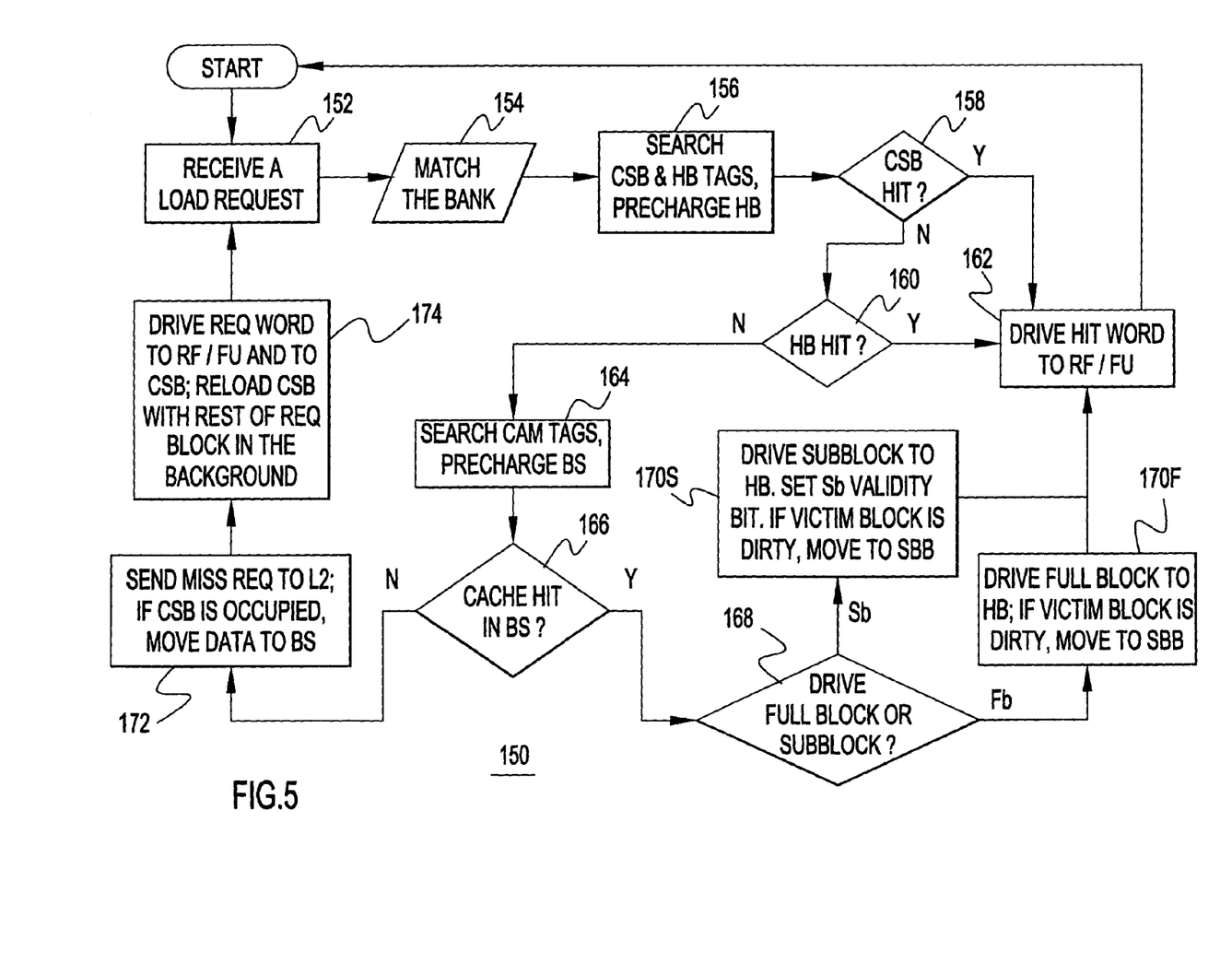
FIG. 5 shows a flow diagram for a load access (read) in a preferred multibank CAMRAM cache.

FIG. 5 shows a flow diagram 150 for a load access (read) in a preferred multibank CAMRAM cache, with reference to the CAMRAM cache 130 example in FIG. 4. First, in step 152 the CAMRAM cache 130 receives a load request directed to a memory location that may be in cache 130. In step 154 the bank identifier 144 selects a bank 132. In step 156, using the target tag 142, the CSB line 134 and the i-CAM 104 are searched for the tag 142. Coincidentally, the HB 108 is precharged. If the tag is found in the CSB line 134 in step 158 or in the i-CAM 104 in step 160, then the first phase and the search completes in step 162 when the result is returned to the particular register file/ functional unit (RF/FU). Otherwise, if the tag is not found in the CSB line 134 in step 158 or in the i-CAM 104 in step 160, the tag was not found in the first phase. Instead, in step 164 the second phase begins searching the n-CAM 102 for the tag. If the tag is found in the n-CAM 102 in step 166, then in step 168, the associated data is checked to determine whether it is a block or sub-block. If it is a sub-block, then in step 170s the sub-block is passed to the HB 108 and a sub-block (Sb) validity bit (not shown) is set. The validity bit is not set for other sub-blocks mapping to that cache line. So, accesses to any of the other those sub-blocks generates further misses, which causes the corresponding data to be loaded into the frame of the already allocated line in the HB and setting the respective validity bit. Otherwise, the full block is being loaded, obviating the need to set validity bits and in step 170f the block is passed to the HB 108. The victim block may have been previously modified and, if so, it is passed to the SBB 136. If, however, the tag is not found in the n-CAM 102 in step 166, i.e., in the second phase; then, in step 172 a miss indication 116 is returned and, if the CSB line 134 is occupied, its contents are passed to HC 106. Finally, in step 174 when the requested block is returned, e.g., from the L2cache, the block is stored in the CSB line 134 and, returning to step 152, the block is passed through the CAMRAM cache 132 in a next first pass, following first pass steps 154-160.

Figure 6:
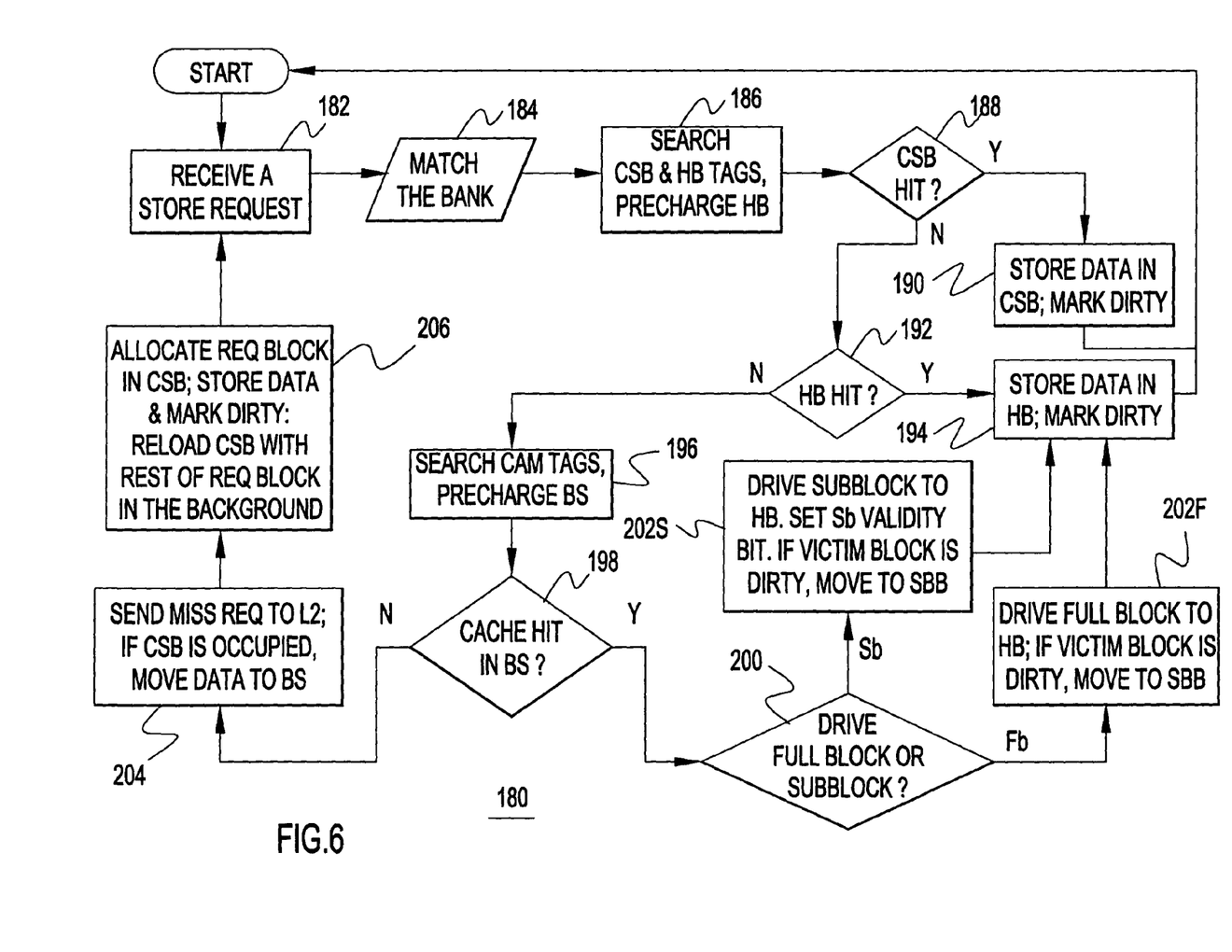
FIG. 6 shows a flow diagram for a store access (write) to a preferred multibank CAMRAM cache.

FIG. 6 shows a flow diagram 180 for a store access (write) to a preferred multibank CAMRAM cache, again with reference to the CAMRAM cache 130 example in FIG. 4. First, in step 182 the CAMRAM cache 130 receives a store request directed to a memory location that may be in cache 130. In step 184 the bank identifier 144 selects a bank 132. In step 186, using the target tag 142, the CSB line 134 and the i-CAM 104 are searched for the tag 142. Coincidentally, the HB 108 is precharged. If the tag is found in the CSB line 134 in step 188, then, in step 190 the data is stored in the CSB line 134, which is marked as dirty to end the first phase and the search. Otherwise, if the tag is found in the i-cache 104 in step 192, then in step 194, the data is stored in the associated HB 108, which also is marked as dirty ending the first phase and the search. However, if the tag is not found in either the CSB line 134 in step 188 or the i-cache 104 in step 192, the tag was not found in the first phase. Instead, in step 196 the second phase begins searching the n-CAM 102 for the tag. If the tag is found in the n-CAM 102 in step 198, then in step 200, the associated data is checked whether it is a block or sub-block. If it is a sub-block, then in step 202s the sub-block is passed to the HB 108 and a sub-block (Sb) validity bit (not shown) is set. Otherwise in step 202f the block is passed to the HB 108. The victim block may have been previously modified and, if so, it is passed to the SBB 136. However, if the tag is not found in the n-CAM 102 in step 198, i.e., in the second phase; then in step 204 a miss indication 116 is returned and, if the CSB line 134 is occupied, its contents are passed to HC 106. Finally, in step 206 when the requested block is returned, e.g., from the L2 cache, the block is stored in the CSB line 134 and, returning to step 182, the block is passed through the CAMRAM cache 130 in a next first pass, following first pass steps 184-194.

Accordingly, the present invention leverages the inherent spatial and temporal locality behavior patterns of program code and data elements in applications, in particular in minimizing cache power consumption and, correspondingly, overall system power consumption. Further, the present invention distributes cached data into data cache structures so as to take advantage of the high associativity of modular code in combination with a larger holding/holding-victim cache, while incurring less performance and power consumption penalties.

While the invention has been described in terms of preferred embodiments, those skilled in the art will recognize that the invention can be practiced with modification within the spirit and scope of the appended claims.

What is claimed is:

1. A cache memory comprising:
   a cache buffer containing most recently accessed data;
   a storage array comprising a plurality of cache memory locations and selectively receiving data from said cache buffer, selectively received said data being stored in ones of said memory locations; and
   a tag memory storing tags associated with data in said storage array and selected data in said cache buffer, wherein cache power is substantially less for accessing said data in said cache buffer than for accessing data in said storage array.

2. A cache memory as in claim 1, wherein cache input data selectively includes executable commands.

3. A cache memory as in claim 1, wherein said cache buffer comprises:
   a cache input buffer receiving cache input data.

4. A cache memory as in claim 3, wherein said cache buffer further comprises:
   an output buffer, ones of said tags in said tag memory associated with said most recently accessed data in said output buffer.

5. A cache memory as in claim 4, wherein said tag memory comprises:
   a first content addressable memory (CAM) containing tags associated with data stored in said storage array; and
   a second CAM containing tags associated with said most recently accessed data.

6. A cache memory as in claim 5, wherein a tag for requested data is checked against tags in said second CAM and said cache input buffer before checking tags in said first CAM.

7. A cache memory as in claim 5, wherein each of said first CAM and said second CAM are a circulating first in first out register (FIFO).

8. A cache memory as in claim 4, wherein each said storage array is a static random access (SRAM) array.

9. A content addressable memory (CAM) random access memory (RAM) cache comprising a plurality of CAMRAM banks, each of said CAMRAM banks comprising:
   a cache buffer containing most recently accessed data and receiving cache input data, said cache input data selectively including executable commands, wherein said cache buffer comprises:
     an input buffer line receiving a cache input data line, and
     an output buffer containing said most recently accessed data, ones of said tags in said CAM being associated with said most recently accessed data;
   a bank store comprising a plurality of cache memory locations and selectively receiving data from said cache buffer, selectively received said data being stored in ones of said memory locations; and
   a CAM storing tags associated with data in said storage array and selected data in said cache buffer, wherein said CAM comprises:
     an n-CAM having n tag locations, each n-CAM tag location being associated with one of n storage locations in said bank store, and
     an i-CAM containing i tag locations, wherein n>i and each i-CAM tag location is associated with a location in said output buffer, wherein each of said n-CAM and said i-CAM are a circulating first in first out register (FIFO).

10. A CAMRAM as in claim 9, further comprising a cache storage buffer, each said input buffer line in said plurality of CAMRAM banks being a line in said cache storage buffer.

11. A CAMRAM as in claim 9, further comprising means for checking a tag for requested data against tags in said i CAM and said cache input buffer independent of tags in said n CAM.

12. A CAMRAM as in claim 11, wherein said checking means only checks for said tag in said n CAM, when said tag is not found in said i CAM or in said cache input buffer.

13. A CAMRAM as in claim 12, wherein cache power is substantially less for accessing said data in said cache buffer than for accessing data in said bank store.

14. A CAMRAM as in claim 9, wherein said bank store is a static random access (SRAM) array.

15. A method of managing data in a cache, said method comprising the steps of:
   a) providing incoming data to an input buffer;
   b) selectively loading data from said input buffer into a storage array;
   c) selectively loading accessed data from said storage array to an output buffer, a number of most recently accessed data blocks being held in said output buffer;
   d) selectively providing data from each of said input buffer, said storage array and said output buffer responsive to an access request;
   e) receiving an access request for data;
   f) checking said input data buffer for data requested for access; and
   g) checking said output buffer for said data requested for access, wherein said output buffer is checked in step (g) coincident with checking said input buffer in step (f).

16. A method of managing data as in claim 15, wherein said access request is a store request and said method further comprises the steps of:
   h) storing said data in said output buffer; and
   i) marking said stored data as dirty.

17. A method of managing data as in claim 15, wherein whenever said data requested for access is not found in said output buffer or said input buffer, said method further comprises the steps of:
   h) checking said storage array for said data requested for access.

18. A method of managing data as in claim 17, wherein whenever said data requested for access is found in said storage array, said method further comprises the steps of:
   i) loading said data requested for access into said output buffer; and
   j) providing said data requested for access as an output.

19. A method of managing data as in claim 17, wherein whenever said data requested for access is not found in said storage array, said method further comprises the steps of:
   i) sending a miss request;
   j) loading said input buffer; and
   k) providing said data from said input buffer as an output.

20. A method of managing data as in claim 19, wherein whenever said input buffer contains data other than said data requested for access, said sending step (h) further comprises loading other said data from input buffer to said output buffer.

21. A method of managing data as in claim 17, wherein data in each of said input buffer, said storage array and said output buffer are identified by tags, said tags being checked in checking steps (f), (g) and (h).

22. A cache memory comprising:
   a cache buffer containing most recently accessed data, wherein said cache buffer further comprises an output buffer, ones of said tags in said tag memory associated with said most recently accessed data in said output buffer;

a storage array comprising a plurality of cache memory locations and selectively receiving data from said cache buffer, selectively received said data being stored in ones of said memory locations; and a tag memory storing tags associated with data in said storage array and selected data in said cache buffer, wherein said tag memory comprises:
- a first content addressable memory (CAM) containing tags associated with data stored in said storage array, and
- a second CAM containing tags associated with said most recently accessed data, wherein each of said first CAM and said second CAM are a circulating first in first out register (FIFO).

23. A content addressable memory (CAM) random access memory (RAM) cache comprising a plurality of CAMRAM banks, each of said CAMRAM banks comprising:

a cache buffer containing most recently accessed data and receiving cache input data, said cache input data selectively including executable commands, wherein said cache buffer comprises:
- an input buffer line receiving a cache input data line, and
- an output buffer containing said most recently accessed data, ones of said tags in said CAM being associated with said most recently accessed data;

a bank store comprising a plurality of cache memory locations and selectively receiving data from said cache buffer, selectively received said data being stored in ones of said memory locations; and a CAM storing tags associated with data in said storage array and selected data in said cache buffer, wherein said CAM comprises:
- an n-CAM having n tag locations, each n-CAM tag location being associated with one of n storage locations in said bank store, an i-CAM containing i tag locations, wherein n>i and each i-CAM tag location is associated with a location in said output buffer; and means for checking a tag for requested data against tags in said i CAM and said cache input buffer independent of tags in said n CAM, wherein said checking means only checks for said tag in said n CAM, when said tag is not found in said i CAM or in said cache input buffer and wherein cache power is substantially less for accessing said data in said cache buffer than for accessing data in said bank store.

* * * * *